(12) United States Patent
Tang et al.

(10) Patent No.: US 11,097,760 B2
(45) Date of Patent: Aug. 24, 2021

(54) SELF-DRIVING SYSTEMS WITH INVENTORY HOLDER

(71) Applicant: LINGDONG TECHNOLOGY (BEIJING) CO. LTD, Beijing (CN)

(72) Inventors: Yaming Tang, Beijing (CN); Chiung Lin Chen, Beijing (CN)

(73) Assignee: LINGDONG TECHNOLOGY (BEIJING) CO. LTD, Beijing (CN)

(*) Notice: Subject to any disclaimer, the term of this patent is extended or adjusted under 35 U.S.C. 154(b) by 369 days.

(21) Appl. No.: 16/083,847

(22) PCT Filed: Aug. 28, 2018

(86) PCT No.: PCT/CN2018/102640
§ 371 (c)(1),
(2) Date: Sep. 10, 2018

(87) PCT Pub. No.: WO2020/041965
PCT Pub. Date: Mar. 5, 2020

(65) Prior Publication Data
US 2020/0307667 A1    Oct. 1, 2020

(51) Int. Cl.
*B62B 5/00* (2006.01)
*B62B 3/02* (2006.01)
(Continued)

(52) U.S. Cl.
CPC .............. *B62B 5/0069* (2013.01); *B62B 3/02* (2013.01); *B66F 9/063* (2013.01); *G05D 1/0238* (2013.01);
(Continued)

(58) Field of Classification Search
CPC ......... B62B 5/0069; B62B 3/02; B62B 3/002; B62B 2203/10; B66F 9/00; B66F 9/06
See application file for complete search history.

(56) References Cited

U.S. PATENT DOCUMENTS 5,992,572 A * 11/1999 Gilliland ................... B66F 9/06
182/148
9,108,931 B2 * 8/2015 Deigin ................. C07K 5/0215
(Continued)

FOREIGN PATENT DOCUMENTS

CN     105077950 A    11/2015
CN     107423791    * 12/2017  ............. A45C 13/38
(Continued)

OTHER PUBLICATIONS

International Search Report and Written Opinion for PCT/CN2018/102640 dated Dec. 21, 2018.

*Primary Examiner* — Tony H Winner
(74) *Attorney, Agent, or Firm* — NZ Carr Law Office PLLC

(57) ABSTRACT

The present disclosure relates to a self-driving system that can engage and move an inventory holder. The self-driving system includes a mobile base comprising motorized wheels, an actuator disposed within the mobile base, the actuator is operable to adjust a height of the mobile base, a console having an upper portion and a main body, the main body being coupled to a first end of the mobile base in a standing configuration, and a first camera disposed on a first side of the upper portion of the console, the first camera facing a second end of the mobile base opposing the first end.

15 Claims, 7 Drawing Sheets

(51) Int. Cl.
   *B66F 9/06* (2006.01)
   *G05D 1/02* (2020.01)
   *B62B 3/00* (2006.01)
   *B66F 9/075* (2006.01)

(52) U.S. Cl.
   CPC ........... *B62B 3/002* (2013.01); *B62B 2203/10* (2013.01); *B62B 2301/04* (2013.01); *B66F 9/0755* (2013.01); *G05D 2201/0216* (2013.01)

(56) References Cited

U.S. PATENT DOCUMENTS

| | | | |
|---|---|---|---|
| 9,352,745 B1* | 5/2016 | Theobald | G05B 19/41895 |
| 2009/0014219 A1* | 1/2009 | Springston | B62D 51/005 |
| | | | 180/19.1 |
| 2012/0029697 A1* | 2/2012 | Ota | B66F 9/063 |
| | | | 700/253 |
| 2014/0265254 A1* | 9/2014 | Sekine | B66F 9/065 |
| | | | 280/638 |
| 2016/0280523 A1* | 9/2016 | Hoffman | B62B 5/063 |
| 2020/0215955 A1* | 7/2020 | Aljallis | B62B 5/0069 |

FOREIGN PATENT DOCUMENTS

| | | | | |
|---|---|---|---|---|
| CN | 107423791 A | 12/2017 | | |
| CN | 206760997 U | 12/2017 | | |
| CN | 207370280 U | 5/2018 | | |
| CN | 207411723 U | 5/2018 | | |
| JP | 7-215695 A * | 8/1995 | ................ | B66F 9/24 |
| JP | 7215695 A | 8/1995 | | |

* cited by examiner

SELF-DRIVING SYSTEMS WITH INVENTORY HOLDER

BACKGROUND

Field

Embodiments disclosed herein relate to improved self-driving systems that can engage and move an inventory holder.

Description of the Related Art

Automatic Guided Vehicles (AGVs) are driverless, programmable controlled vehicles that can transport articles or inventory, items from designated pickup area(s) to unloading area(s) within a facility. These vehicles may be guided by magnetic tapes, optical, or other suitable systems for route guidance and collision avoidance, AGVs can provide a safer environment for workers, inventory items, and equipment with precise and controlled movement. However, workers may still be required to use wheeled carts to help AGVs load, unload or move inventory items at designated areas, thereby limiting the benefits of automation.

SUMMARY

In one embodiment, a self-driving system includes a mobile base comprising motorized wheels, an actuator disposed within the mobile base, the actuator is operable to adjust a height of the mobile base, a console having an upper portion and a main body, the main body being coupled to a first end of the mobile base in a standing configuration, and a first camera disposed on a first side of the upper portion of the console, the first camera facing a second end of the mobile base opposing the first end.

In one embodiment, a method of operating a self-driving system includes identifying boundaries of an inventory holder using a camera disposed on a console of a self-driving system, the console being coupled to an end of the self-driving system in a standing configuration, moving the self-driving system into a docking position with the inventory holder based on the identified boundaries, determining if the inventory holder is properly docked with the self-driving system, and raising a portion of the self-driving system to lift the inventory holder.

In one embodiment, a self-driving system includes a mobile base comprising a support surface and motorized wheels disposed under the support surface, the support surface having a first sensor disposed at a first end of the mobile base and a second sensor disposed at a second end of the mobile base opposing the first end, an actuator disposed within the mobile base, a console coupled to the first end of the mobile base in a standing configuration, wherein the actuator is operable to adjust a height of the mobile base when the first and second sensors detect a change of state from non-blocked to being blocked or from being blocked to non-blocked.

In one embodiment, a self-driving system includes a mobile base comprising a first sensor, a second sensor, a support surface, and motorized wheels disposed under the support surface, wherein the first sensor is disposed at a first side of the mobile base, the second sensor is disposed at a second side of the mobile base opposing the first side, an actuator disposed within the mobile base, and a console coupled to a first end of the mobile base in a standing configuration, wherein the actuator is operable to adjust a height of the mobile base when the first and second sensors detect a change of state from non-blocked to being blocked or from being blocked to non-blocked.

In one embodiment, a self-driving system includes a mobile base comprising a support surface and motorized wheels disposed under the support surface, an actuator disposed within the mobile base, a console coupled to a first end of the mobile base in a standing configuration, and a plurality of proximity sensors disposed on long sides of the mobile base, wherein the actuator is operable to adjust a height of the mobile base when the plurality of proximity sensors on long sides of the mobile base detect a change of state from non-blocked to being blocked or from being blocked to non-blocked.

In one embodiment, a self-driving system includes a mobile base comprising a support surface and motorized wheels disposed under the support surface, the support surface having a first sensor and a second sensor, an actuator disposed within the mobile base, a console coupled to a first end of the mobile base in a standing configuration, and a contact type sensor disposed on the upper surface, wherein the actuator is operable to adjust a height of the mobile base when the contact type sensor detects a contact with an object.

DETAILED DESCRIPTION

Embodiments of the present disclosure include an automated guided vehicle (AGV) that is a self-driving system and can securely raise and move an inventory holder. The AGV has a console coupled to a mobile base in a standing configuration. The mobile base is capable of moving the inventory holder within a facility based on a given instruction, such as routing and task instructions. The console and the mobile base use one or more sensors or cameras to ensure proper docking or engagement with the inventory holder. While the term AGV is used, the concept of this disclosure can be applied to any mobile robots, such as autonomously-navigating mobile robots, inertially-guided robots, remote-controlled mobile robots, and robots guided by laser targeting, vision systems, or roadmaps. In addition, while the embodiments of this disclosure are described with respect to AGVs moving inventory in a warehouse environment, the embodiments and the concept may also be used in a warehouse environment or any type of environment such as hospital, airport, or shopping center, etc. Various embodiments are discussed in greater detail below with respect to FIGS. 1-7.

Figure 1:
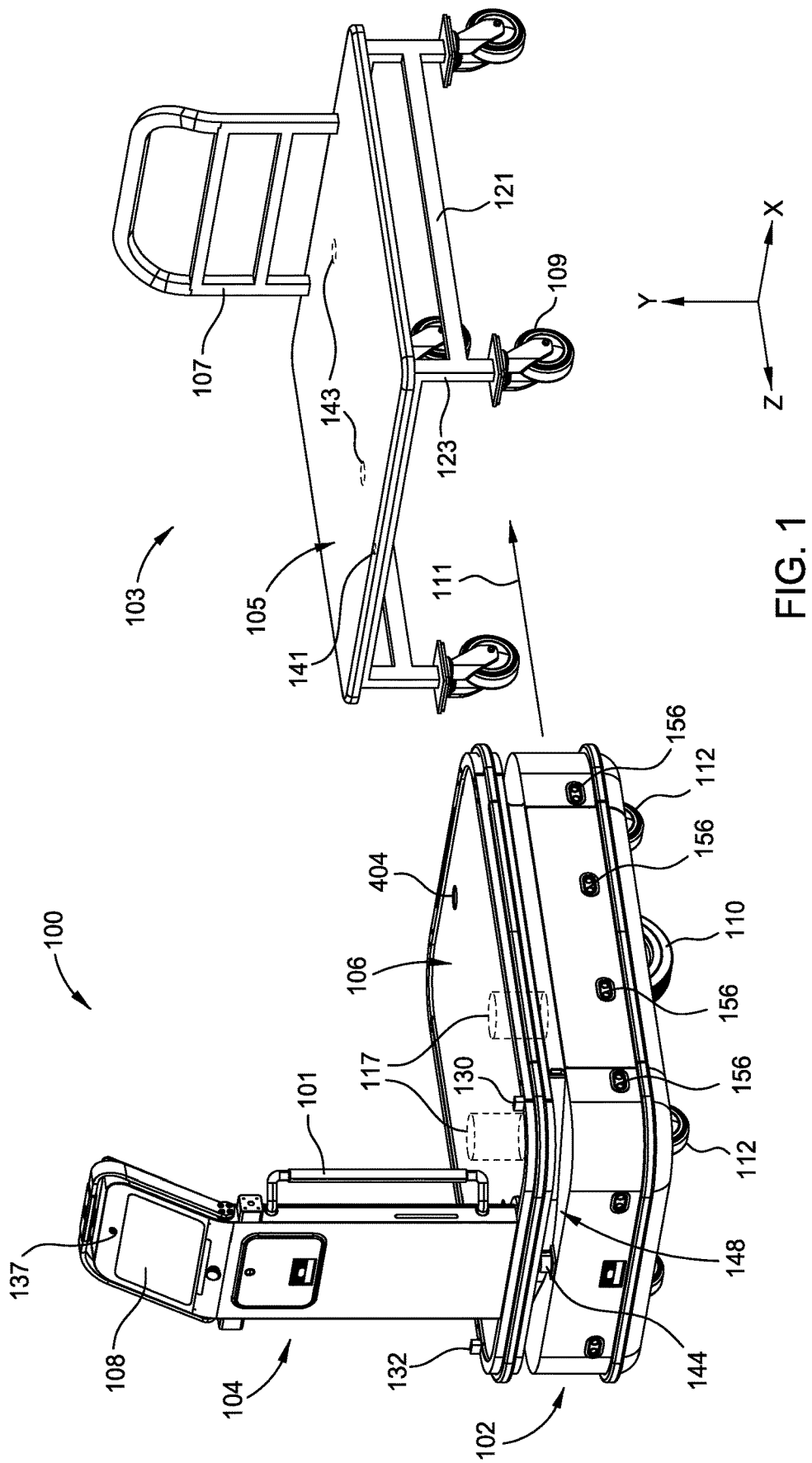
FIG. 1 perspective view of an automated guided vehicle (AGV) prior to engaging with an inventory holder according to one embodiment.
Figure 2:
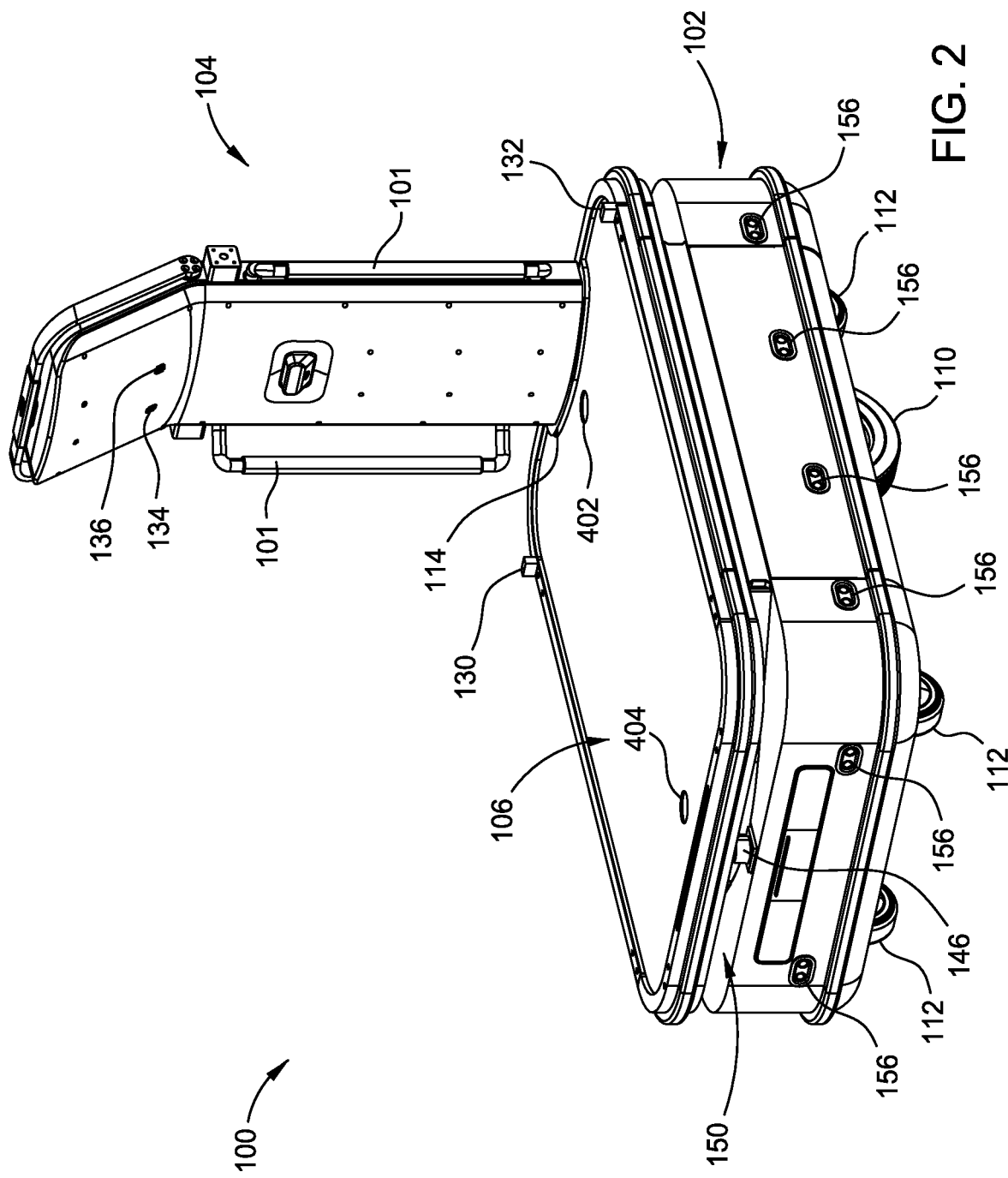
FIG. 2 is another perspective view of the AGV of FIG. 1.

FIG. 1 is a perspective view of an automated guided vehicle (AGV) 100 prior to engaging with an inventory holder 103 according to one embodiment. FIG. 2 is another perspective view of the AGV 100, The AGV 100 is adapted to drive itself without the operator. The AGV 100 generally includes a mobile base 102 and a console 104. The console 104 has an upper portion 138 and a main body 140. The main body 140 of the console 104 is coupled to an end of the mobile base 102 in a standing or upright configuration. One or more handles 101 are provided on either side of the console 104 to allow an operator to manipulate movement of the AGV 100. The console 104 has a display 108 configured to display information and allow the operator to control the operation of the AGV 100. The display 108 can be any suitable user input device for providing information associated with commands, map of the facility, routing information, inventory information, and inventory holder/inventory storage, etc. If manual use of the AGV is desired, the operator can override the automatic operation of the AGV 100 by entering updated commands via the display 108.

The mobile base 102 has a plurality of motorized wheels 110 and a plurality of stabilizing wheels 112. In one embodiment, the mobile base 102 has two motorized wheels 110 and four stabilizing wheels 112. The stabilizing wheels 112 may be caster-type wheels and positioned at four corners of the mobile base 102. The motorized wheels 110 may be located underneath the mobile base 102 between the front stabilizing wheels 112 and the rear stabilizing wheels 112. Each of the motorized wheels 110 is configured to rotate and/or roll in any given directions. For example, the motorized wheels 110 can rotate about the Z-axis and roll on the ground along the X-axis or Y-axis. The motorized wheels 110 may be controlled to roll at different speed. If desired, any or all of the stabilizing wheels 112 may be motorized.

The mobile base 102 has an upper surface 106 that can be used to support a portion of an inventory holder 103. The inventory holder 103 generally includes a support plate 105, a handle 107 attached to a side of the support plate 105, and four wheels 109 coupled to the support plate 105 through support legs 123. The support plate 105 can be a flat solid plate or a grill-like structure. The inventory holder 103 may optionally include one or more rods 121 connecting the support legs 123 to enhance the mechanical strength of the inventory holder 103. The inventory holder 103 is sized to accommodate with the mobile base 102. For example, the height of the support plate 105 and the distance between the front wheels 109 can be configured to allow a portion of the mobile base 102 (e.g., upper surface 106) to get under the support plate 105.

The AGV 100 is programmed and/or controlled to locate the inventory holder 103. Once the inventory holder 103 is located, the AG V 100 will move towards the inventory holder 103 along a direction indicated by an arrow 111. The arrow 111 is parallel with the longitudinal direction of the inventory holder 103. The AGV 100 has or can obtain information about the inventory holder 103, such as the specification, dimension, or shape, etc. The sensors or cameras of the AGV 100 can help identify the inventory holder 103 and guide the docking procedure of the AGV 100 with the inventory holder 103. Alternatively, the operator may manually dock the inventory holder 103 with the AGV 100, In either case, the inventory holder 103 is considered properly docked with the AGV 100 when the upper surface 106 of the mobile base 102 is substantially covered by the support plate 105, or when the AGV 100 is notified by sensors and/or cameras that a proper docking with the inventory holder 103 has been established. As will be discussed in greater detail below, various sensors and/or cameras can be used to align and ensure proper docking between the inventory holder and the AGV 100.

Figure 3:
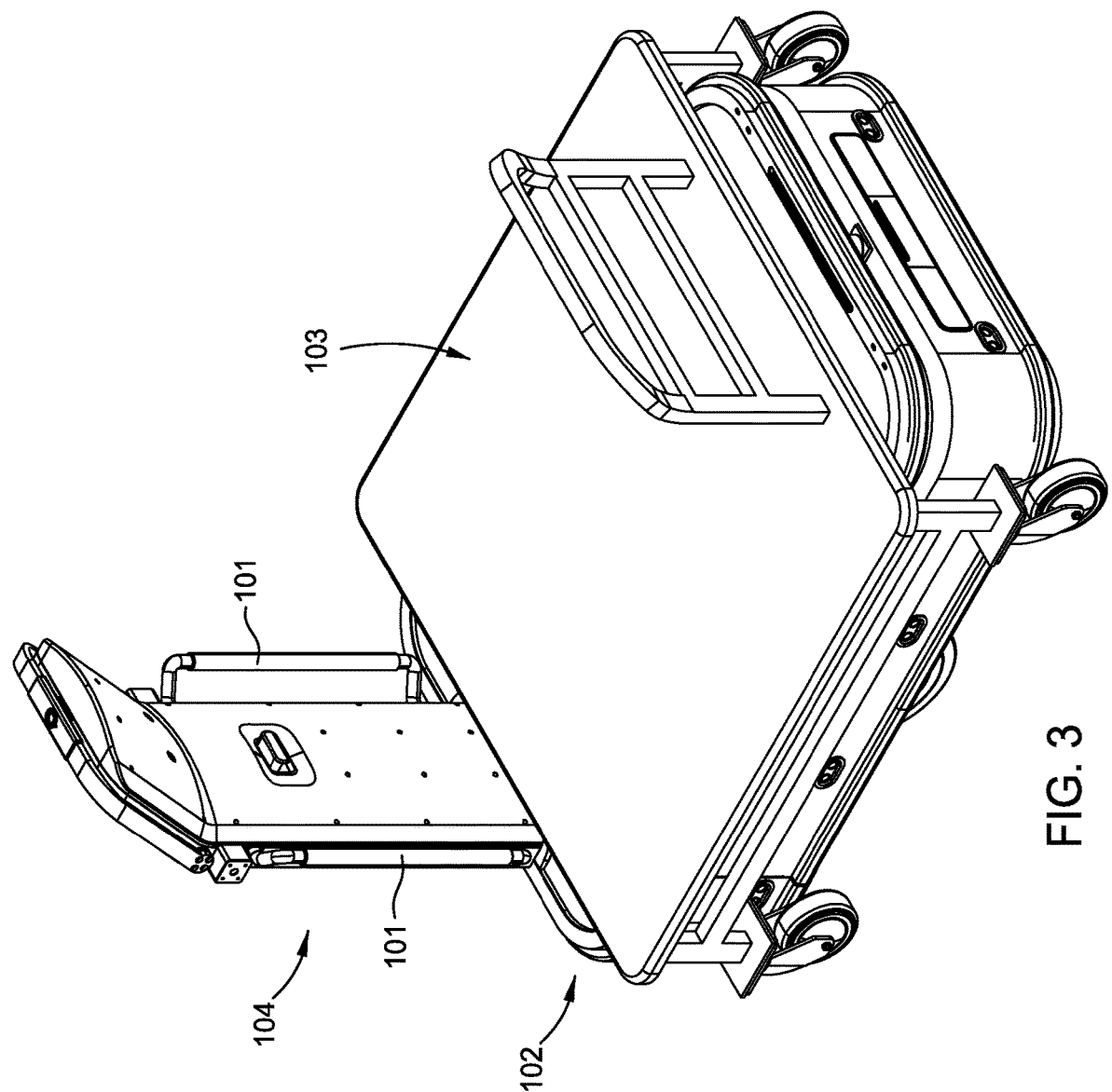
FIG. 3 is a prospective view of the inventory holder docking with the AGV according to one embodiment.

FIG. 3 is a prospective view of the inventory holder 103 docking with the AGV 100 according to one embodiment. While the inventory holder is shown and discussed in this disclosure, it is contemplated that the inventory holder 103 may be replaced with any object such as a handcart, basket, bin, inventory items, or any type of wheeled container that can be used to contain, carry and/or transport items, such as inventory items.

The AGV 100 has a lifting system disposed within the housing of the mobile base 102. The lifting system includes one or more actuators 117. The location of the actuators 117 is shown for illustration purposes. The actuators 117 can be disposed at different locations within the mobile base 102. Each actuator 117 may use a motorized shaft that is operable to move the mobile base 102 vertically with respect to the ground, thereby adjusting a height of the mobile base 102. The upper surface 106 may have a cutout 114 disposed at the front side of the mobile base 102. The cutout 114 is shaped according to the profile of the console 104. In operation, the console 104 may be kept stationary and the upper surface 106 may be moved with respect to the console 104. Therefore, the console 104 does not interfere with the upper surface 106 during the movement of the mobile base 102.

After the inventory holder 103 is docked with the mobile base 102, the actuator 117 is operable to raise the mobile base 102 (and thus the upper surface 106) as appropriate for supporting the inventory holder 103. The mobile base 102 is raised up and in contact with the backside of the support plate 105 to lift the inventory holder 103 off the ground, Therefore, the latitude of the wheels 109 is higher than that of the motorized wheels and the stabilizing wheels 110, 112. Alternatively, the mobile base 102 may be engaged with the inventory holder 103 so that the inventory holder 103 can be pushed, pulled, rolled, carried, or otherwise moved by the mobile base 102. The term "engaged" used in this disclosure is refer to elements which are connected, attached, and/or coupled, either directly or integrally or indirectly via other elements, and either temporarily, removably, or even permanently.

The AGV 100 is then moved autonomously between designated areas within a facility based on commands or instructions received by the AGV 100. For example, the AGV 100 may receive a command that transports the inventory holder 103 to inventory storage, or to a pick-up/drop off area where inventory items are to be loaded/unloaded. Upon arrival of the designated area, the AGV 100 may instruct the actuators 117 to lower the inventory holder 103 and return to location of departure or other pre-determined destinations.

It is contemplated that the command or instruction may be any information associated with various tasks that may be performed within the facility. For example, the information may identify an inventory holder to be moved by the AGV 100, inventory storage, a destination of the inventory holder and/or the AGV 100, a current location of the AGV 100, and/or adjust the height of the upper surface 106 of the mobile base 102 of the AGV 100, etc. The command or instruction may be sent wirelessly over an internet, through a wired connection, or using any suitable manner to communicate with an operator or a management system.

Examples of wireless communication may include, but are not limited to, ultra-wideband, radio frequency identification (active and/or passive), Bluetooth, WiFi, and/or any other form of communication.

The AGV 100 includes one or more sensors or cameras to ensure proper docking or engagement with the inventory holder 103 or any other objects such as inventory items. The sensors or cameras to be discussed below with respect to FIGS. 1, 2, and 4-6 allow the AGV 100 to determine whether the inventory holder 103/object is properly docked/placed and ready to be lifted up. In addition, the combination of the information recorded, detected, and/or measured by the sensors or cameras can be used to help autonomously move the AGV 100 in a given direction while avoiding nearby obstacles. In some cases, the combination of the information recorded, detected, and/or measured by the sensors or cameras can be used to help autonomously maintain the AGV 100 in a rear follow position and/or a side follow position next to an operator. For example, the AGV 100 may be programmed or controlled to maintain in the side follow position as the operator moves in a given direction. In such a case; the AGV 100 may be programmed or controlled to maintain within a side distance of the operator. The side distance can be adjusted (e.g. increased or decreased) and set as desired by the operator. The side distance can be adjusted and set by a mobile phone, a wristband, and/or a gesture of the operator as identified by the sensors or cameras.

Figure 4:
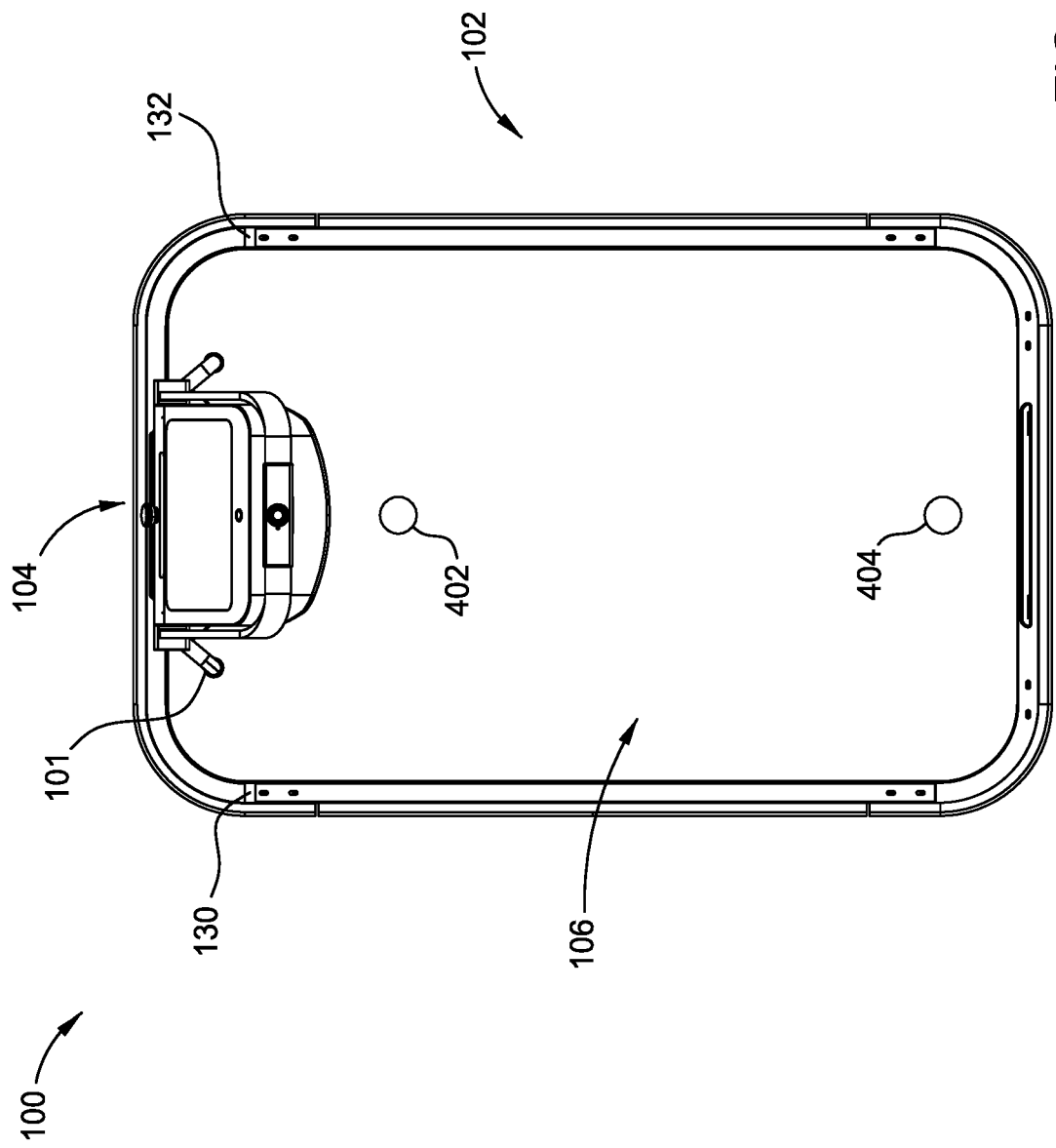
FIG. 4 is top view of the AGV according to one embodiment.

FIG. 4 is a top view of the AGV 100 according to one embodiment. The AGV 100 may include one or more non-contact type sensors to detect the position or presence of an object, such as the inventory holder 103. In one embodiment, two sensors 402, 404 are provided on the mobile base 102 where the first sensor 402 is shown located near the console 104 and the second sensor 404 is shown near the periphery of the upper surface 106 and away from the console 104. In some cases, the second sensor 404 may be omitted. Any number of sensors may be used and located at different positions on the mobile base 102. Each of the sensors 402, 404 represents one or more sensors, detectors or other components suitable for detecting the position or presence of the inventory holder 103.

In one embodiment, the sensors 402, 404 are reflective-type photosensors. In such a case, each sensor 402, 404 may include an emitter and a receiver. Light from the emitter is transmitted in a straight line. When an inventory holder (or any object such as inventory items) blocks the light path, the transmitted light is reflected by the inventory holder (or the object) and received by the receiver, which changes the state of the sensors 402, 404. When both sensors 402, 404 are blocked, the AGV 100 is notified that the inventory holder is properly docked and ready to be lifted up. For example, the one or more actuators 117 may raise or adjust the height of the upper surface 106 of the mobile base 102 if both sensors 402, 404 detect a change of state from non-blocked to being blocked. Likewise, the one or more actuators 117 may lower or adjust the height of the upper surface 106 of the mobile base 102 if both sensors 402, 404 detect a change of state from being blocked to non-blocked.

It is contemplated that the sensors 402, 404 may also be any suitable sensors that can be configured to detect the presence of nearby objects, such as sonar sensors, ultrasonic sensors, infrared sensors, radar sensors, LiDAR, and any combination thereof.

In one embodiment, which can be combined with any one or more embodiments described in this disclosure, the AGV 100 may include one or more contact type sensors to detect contact with an object, such as the inventory holder 103. The contact type sensor can be a pressure sensor or any suitable or component that is capable of detecting physical contact or applied force. FIG. 4 further shows that two contact type sensors 130, 132 are provided on either side of the mobile base 102 near the console 104. For example, the contact type sensors 130, 132 may be disposed at the periphery of the upper surface 106. Any number of contact type sensors may be used and located at different positions on the mobile base 102. In any case, the location of the contact type sensors 130, 132 is chosen to prevent the inventory holder from damaging the console 104 when docked with the AGV 100. When a portion of the inventory holder the support plate 105, or a rod that connects two front stabilizing wheels) contacts both contact type sensors 130, 132, the AGV 100 is notified that the inventory holder is properly docked and ready to be lifted up.

Figure 5:
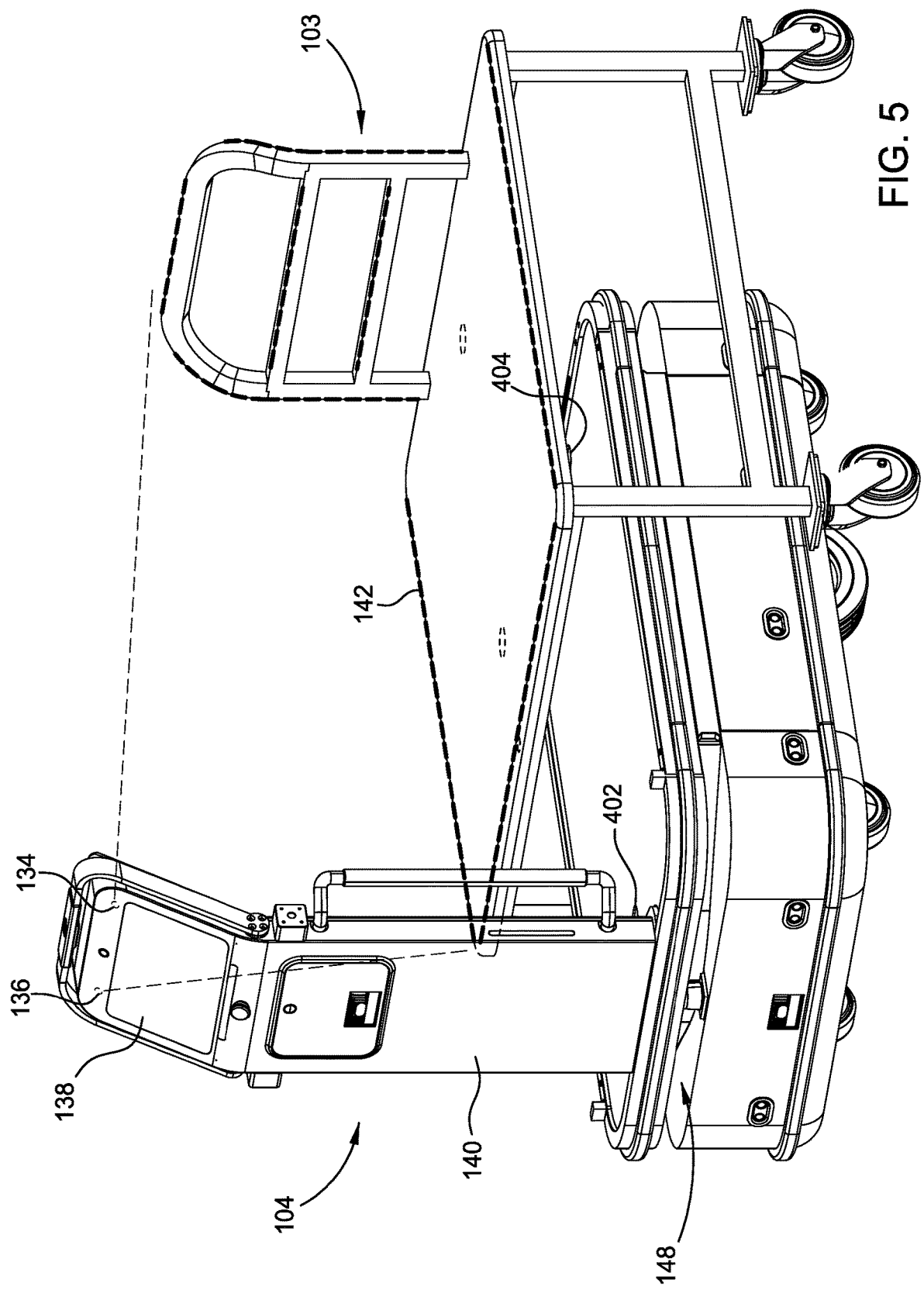
FIG. 5 is a perspective view of the inventory holder being docked with the AGV according to one embodiment.

In one embodiment, which can be combined with any one or more embodiments described in this disclosure, the AGV 100 may include one or more cameras to determine whether an object, such as the inventory holder 103, is in proper docking position with the AGV 100. The cameras 134, 136 may include a monocular camera, a binocular camera, and/or a stereo camera. The cameras 134, 136 can be a camera having a 360 degree viewing range. The camera is configured to take and/or record visual images and detect the presence of nearby objects (similar to proximity sensors 402, 404). FIG. 5 is a perspective view of the inventory holder 103 being docked with the AGV 100 according to one embodiment.

In one embodiment, two cameras 134, 136 are provided on the upper portion 138 of the console 104 facing the rear side (i.e., the side away from the console 104) of the mobile base 102. Any number of cameras may be used and located at different positions on the AGV 100. The longitudinal direction of the upper portion 138 of the console 104 is held at an angle with respect to the longitudinal direction of the main body 140. The angle is chosen to allow the cameras 134, 136 to identify or measure the boundaries 142 (represented by dotted lines) of the inventory holder 103, such as boundaries of a portion of the support plate 105. The cameras 134, 136 can also be configured to provide an image capturing range that includes areas in the back and on both sides of the AGV 100. The image capturing range may include a 180 degree viewing area, a 270 degree viewing area, a 360 degree viewing area, or any viewing area between 180 degrees and 360 degrees. For example, the angle may be in a range from about 105 degrees to about 165 degrees, such as about 120 degrees to about 150 degrees. Wider or narrower range of angles is contemplated and can be adjusted depending on the size of the AGV or inventory holder.

In one embodiment, the cameras 134, 136 are configured to cover at least the boundaries of the support plate 105 and the handle 107. The identified boundaries 142 may be recorded as images or any appropriate form of data. The images or data are then compared and calculated by the AGV 100 to determine whether the inventory holder 103 is close enough to the AGV 100. Once the AGV 100 determines the inventory holder is properly docked, the mobile base 102 will lift the inventory holder 103 and go to the designated area.

In some embodiments, one or more cameras 137 are further provided on the upper portion 138 of the console 104 facing away from the mobile base 102. The cameras 137 can be identical to the cameras 134, 136. The one or more cameras 137 are located on the opposite side of the console 104 from where the cameras 134, 136 are located. The camera 137 can be used for obstacle detection and avoidance. In some cases, the camera 137 is configured to follow a target, such as an operator. In some cases, the camera 137 can also be configured to identify the shape, body, or boundaries of the operator so that the AGV 100 can maintain in the side follow position as the operator moves in a given direction. In some cases, the camera 137 can be configured to read/identify a barcode or identifier (e.g., a marker) that may be seen in the facility, such as on a pole or a working station. Any number of sensors or cameras 137 may be used and located at different positions on the console 104.

In some embodiments, the cameras 134, 136 can include a scanner or be configured to scan a barcode or identifier (e.g., a marker) on the inventory items that are already placed on, or to be put onto the inventory holder 103. The barcode or identifier may contain information associated with the inventory items. The cameras 134, 136 can determine whether all the inventory items have been collected based on the commands or information received from the management system.

In some embodiments, the inventory holder 103 may have one or more marks 141 disposed at the front side, or any appropriate locations of the inventory holder 103, such as on the support plate 105, handle 107 rod 121 or support legs 123. The marks 141 may be a reflective marker or radiofrequency (RF) emitter that is configured to allow the cameras 134, 136, or any sensors described in various, embodiments of this disclosure to detect and read. The AGV 100 is programmed or controlled to align, dock and undock with the inventory holder 103 based on the inventory holder information pre-stored in the AGV 100 or obtained from the operator or management system.

In some embodiments, the inventory holder 103 may have one or more marks 143 disposed on the backside of the support plate 105. The marks 143 may be disposed at locations corresponding to the sensors, for example the sensors 402, 404 on the mobile base 102. The marks 143 may be reflective markers or any suitable identifiers. The sensors can detect the marks 143 and determine its location relative to the mobile base 102, thereby facilitating alignment and/or docking of the inventory holder 103 with the AGV 100.

In one embodiment, which can be combined with any one or more embodiments described in this disclosure, the AGV 100 may include one or more sensors for obstacle detection and avoidance. The sensors can also be used to detect a portion of an object, such as the rods on the inventory holder 103. With the detected information, the AGV 100 can determine whether the inventory holder is in proper docking position with the AGV 100.

In one embodiment shown in FIGS. 1, 2, and 8, a first sensor 144 and a second sensor 146 are provided at the front side (i.e., the side near the console 104) and the rear side (i.e., the side away from the console 104) of mobile base 102, respectively. The front side of the mobile base 102 has a cutout 148 to accommodate the first sensor 144. The cutout 148 extends across the width of the mobile base 102. The first sensor 144 may be located at a region below the console 104. Likewise, the rear side of the mobile base 102 has a cutout 150 to accommodate the second sensor 146. The cutout 150 extends across the width of the mobile base 102, The cutout 150 is positioned opposing and at the same height as the cutout 148. The cutouts 148, 150 may expand radially outwardly from the sensor to the edge of the mobile base 102. The expansion of the cutouts 148, 150 allow the first and second sensors 144, 146 to provide greater sensing area for the AGV 100.

The first and second sensors 144, 146 may be any suitable sonar sensors, ultrasonic sensors, infrared sensors, radar sensors, and/or laser sensors such as LiDAR sensors that can be configured to detect the presence of nearby objects that are stationary or moving. The first and second sensors 144, 146 may be oriented to scan the area in the AGV's direction of travel. For example, the first and second sensors 144, 146 can scan in two-dimensional planes roughly parallel with the ground. The first and second sensors 144, 146 may be configured to scan a field of view of up to 360 degrees, for example about 270 degrees.

Figure 6:
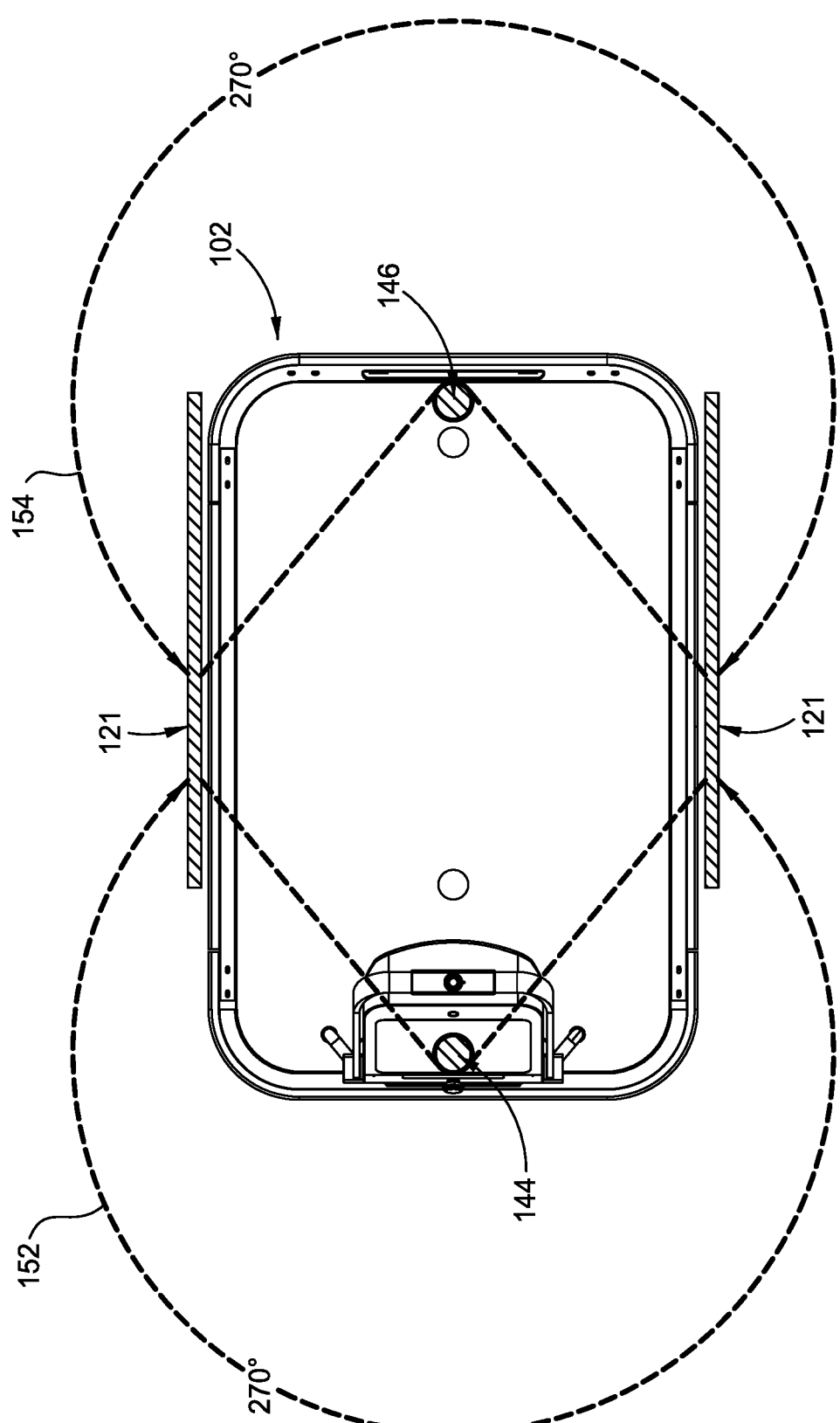
FIG. 6 is a top view of the AGV showing proximate location of sensors and their respective sensing area.

FIG. 6 is a top view of the AGV 100 showing the proximate location of the first and second sensors 144, 146 and their respective sensing areas 152, 154. For clarity, only a portion of the inventory holder 103 is shown. When a portion of the inventory holder (e.g., rods 121 or support legs 123 shown in FIG. 1) enters or blocks the sensing area 152, 154 and sensed by both first and second sensors 144, 146, the AGV 100 is notified that the inventory holder is properly docked and ready to be lifted up. For example, the one or more actuators 117 may raise or adjust the height of the upper surface 106 of the mobile base 102 if both sensors 144, 146 detect a change of state from non-blocked to being blocked. Likewise, the one or more actuators 117 may lower or adjust the height of the upper surface 106 of the mobile base 102 if both sensors 144, 146 detect a change of state from being blocked to non-blocked.

In one embodiment, which can be combined with any one or more embodiments described in this disclosure, the AGV 100 may include one or more sensors to determine whether an object, such as the inventory holder 103, is in proper docking position with the AGV 100. FIGS. 1 and 2 further show that at least twelve sensors 156 are provided on the mobile base 102. The sensors 156 are configured to detect the presence of nearby objects. In one aspect, two sensors 156 are provided on the front side and the rear side of the mobile base 102, respectively, while four sensors 156 are provided on the long sides of the mobile base 102, respectively. Any number of sensors may be used and located at different positions on the mobile base 102. The sensors 156 may be any suitable sonar sensors, ultrasonic sensors, infrared sensors, radar sensors, LiDAR sensors and/or proximity sensors that can be configured to detect the presence of nearby objects.

The sensors 156 may be in a linear arrangement or any suitable arrangement to provide a desired sensing area. Each sensor 156 can be configured to sense a field of view greater or less than about 90 degrees. In one embodiment, the sensors 156 are arranged in accordance with the support legs 123 or rods 121 of the inventory holder 103. When the inventory holder 103 is properly docked with the AGV 100, the sensors 156 on the long side of the mobile base 102 will be blocked by the support legs 123 and/or rods 121 of the inventory holder 103. The sensors 156 will notify the AGV 100 that the inventory holder is properly docked and ready to be lifted up. For example, the one or more actuators 117 may raise or adjust the height of the upper surface 106 of the mobile base 102 if sensors 156 on both long sides of the mobile base 102 detect a change of state from non-blocked to being blocked. Likewise, the one or more actuators 117 may lower or adjust the height of the upper surface 106 of the mobile base 102 if sensors 156 on both long sides of the mobile base 102 detect a change of state from being blocked to non-blocked.

FIG. 1 further shows that the AGV 100 includes a button 158 disposed at the rear side of the mobile base 102. The button 158 can be pushed by an operator to notify the AGV 100 that the inventory holder is properly docked and ready to be lifted up. While the button 158 is shown located on the rear side of the mobile base 102, the button 158 may be located at different positions on the mobile base 102. The button 158 may also be located at the console 104. Additionally or alternatively, the display 108 can provide the function to inform the AGV 100 that the inventory holder is ready to be lifted up.

Figure 7:
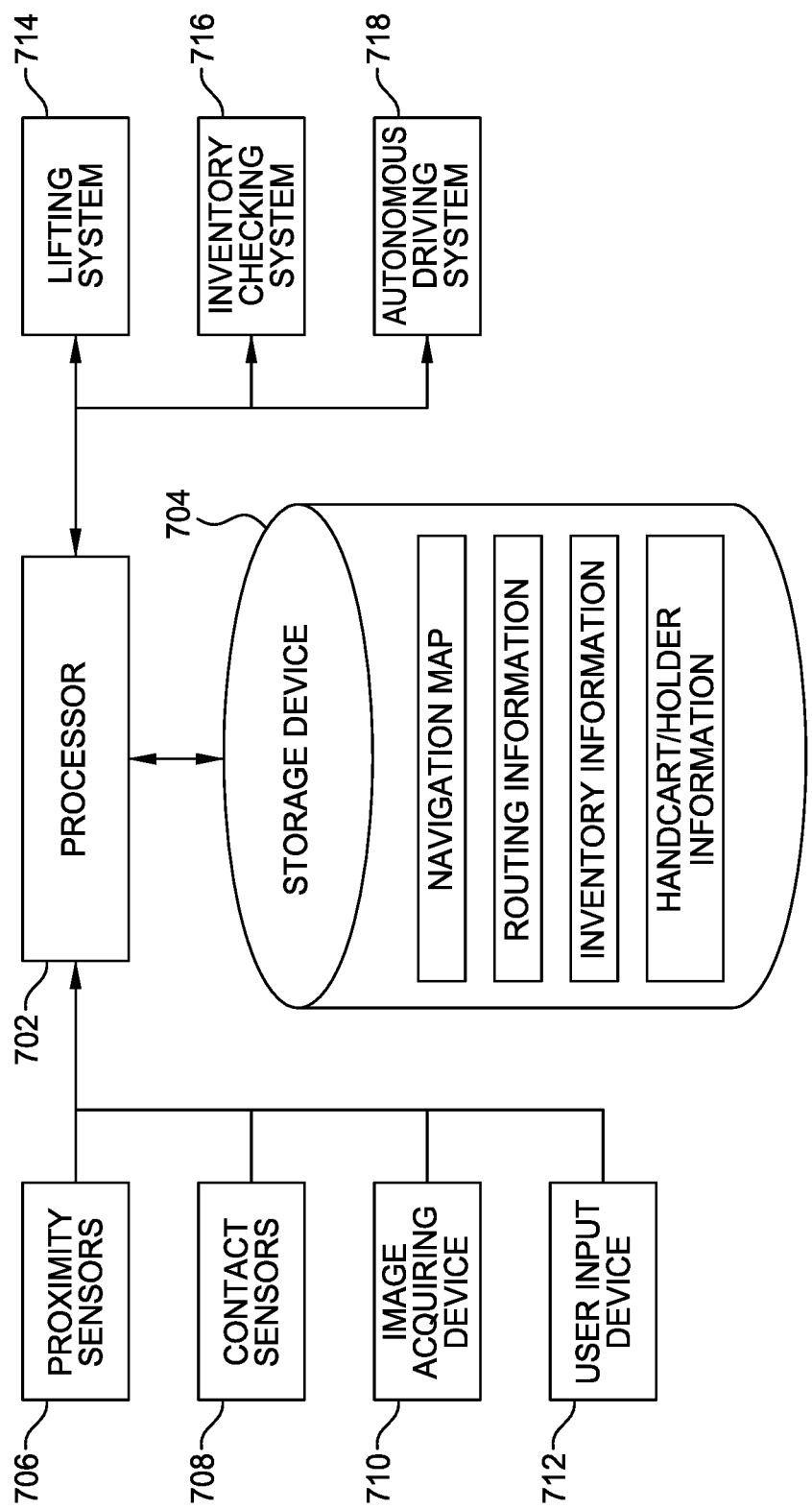
FIG. 7 is a block diagram of an AGV system according to one embodiment of the present disclosure To facilitate understanding, identical reference numerals have been used, where possible, to designate identical elements that are common to the figures. It is contemplated that elements disclosed in one embodiment may be beneficially utilized with other embodiments without specific recitation.

FIG. 7 is a block diagram of an AGV system 700 according to one embodiment of the present disclosure. The AGV system 700 includes a processor 702 that can be configured to perform various tasks or instructions described in this disclosure. The processor 702 is in communication with a storage device 704. The storage device 704 includes data that may be needed for operating the AGV system. The data may include, but is not limited to, a navigation map of a facility (e.g., a warehouse), routing information provided by an operator or a management system, inventory information, and information about inventory holder and/or inventory storage. The data may also include commands or instructions related to various tasks or routing provided by the operator or the management system which can be done in either wired or wirelessly manner.

The processor 702 is also in communication with proximity sensors 706, contact type sensors 708, and image acquiring device 710. The proximity sensors 706 may include any non-contact type sensors described above such as photosensors, laser scanners, sonar sensors, etc. The contact type sensors may include any sensors described above such as pressure sensors. The image acquiring device 710 may include any image taking or recording cameras described above. The information detected or collected by the proximity sensors 706, contact type sensors 708 and the image acquiring device 710 are provided to the processor 702 so that it can determine whether the inventory holder is properly docked and ready to be lifted up. In addition, the combination of the information recorded, detected, or gathered by the sensors and/or cameras can be used to help autonomously move the AGV 100 in a given direction while avoiding nearby obstacles.

The processor 702 is also in communication with a user input, device 712. The user input device 712 may include the display as discussed above to display needed information. The user input device 712 also allows the operator to provide commands/instructions to the AGV system manually, or wirelessly via a remote control.

The processor 702 is further in communication with a lifting system 714, an inventory checking system 716, and an autonomous driving system 718. The lifting system 714 may include an actuator as discussed above for raising or lowering the inventory holder. The inventory checking system 716 may include one or more cameras described above and configured to scan a barcode on the inventory items that are already placed on, or to be put onto the inventory holder during inventory loading process. The processor 702 can also use the information obtained by the cameras to determine whether certain or all the inventory items have been collected based on the commands or information received from the management system. The autonomous driving system 718 may include a mobile base as discussed above. The mobile base can be controlled by the processor 702 to autonomously move in any given direction from one location to another location based on a set of pre-programmed instructions stored in the storage device 704, or commands provided by the operator, management system, or any combination of the information recorded, detected, or gathered by the sensors and/or cameras during operation. The mobile base can also be controlled to follow an operator in a rear follow position and/or a side follow position as discussed above.

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
    a mobile base comprising motorized wheels;
    an actuator disposed within the mobile base, the actuator is operable to adjust a height of the mobile base;
    a console having an upper portion and a main body, the main body being coupled to a first end of the mobile base in a standing configuration;
    a first camera disposed on a first side of the upper portion of the console, the first camera facing a second end of the mobile base opposing the first end; and
    a second camera disposed on a second side of the upper portion, the second side opposing the first side, and the second camera is operable to detect and avoid an obstacle.

2. The system of claim 1, wherein the first camera is operable to identify boundaries of an object to be supported by an upper surface of the mobile base.

3. The system of claim 2, wherein the object is in a form of a handcart, a basket, a bin, or a wheeled container.

4. The system of claim 2, wherein the first camera is operable to scan a barcode or identifier placed on the object.

5. The system of claim 1, wherein the upper portion is held at an angle of about 105 degrees to about 165 degrees with respect to the main body.

6. A self-driving system, comprising:
    a mobile base comprising motorized wheels;
    an actuator disposed within the mobile base, the actuator is operable to adjust a height of the mobile base;
    a console having an upper portion and a main body, the main body being coupled to a first end of the mobile base in a standing configuration;
    a first camera disposed on a first side of the upper portion of the console, the first camera facing a second end of the mobile base opposing the first end; and
    a second camera disposed on a second side of the upper portion, the second side opposing the first side, and the second camera is operable to follow a target.

7. The system of claim 1, further comprising:
    one or more sensors disposed on an upper surface of the mobile base, the one or more sensors are operable to detect the presence of an object to be supported by the upper surface of the mobile base.

8. The system of claim 7, wherein the one or more sensors are reflective-type photosensors.

9. The system of claim 1, further comprising:
    a push button disposed at a rear side of the mobile base, the button is operable to cause the actuator to adjust the height of the mobile base.

10. A self-driving system, comprising:
    a mobile base comprising a support surface and motorized wheels disposed under the support surface, the support surface having a first sensor disposed at a first end of the mobile base and a second sensor disposed at a second end of the mobile base opposing the first end;
    an actuator disposed within the mobile base; and
    a console coupled to the first end of the mobile base in a standing configuration, wherein the actuator is operable to adjust a height of the mobile base when the first and second sensors detect a change of state from non-blocked to being blocked or from being blocked to non-blocked.

11. The system of claim 10, wherein the one or more sensors are reflective photosensors.

12. A self-driving system, comprising:
a mobile base comprising a first sensor, a second sensor, a support surface, and motorized wheels disposed under the support surface, wherein the first sensor is disposed at a first side of the mobile base, the second sensor is disposed at a second side of the mobile base opposing the first side, and the first and second sensors are configured to scan a field of view of up to 360 degrees;
an actuator disposed within the mobile base; and
a console coupled to a first end of the mobile base in a standing configuration,
wherein the actuator is operable to adjust a height of the mobile base when the first and second sensors detect a change of state from non-blocked to being blocked or from being blocked to non-blocked.

13. A self-driving system, comprising:
a mobile base comprising a support surface and motorized wheels disposed under the support surface;
an actuator disposed within the mobile base;
a console coupled to a first end of the mobile base in a standing configuration; and
a plurality of proximity sensors disposed on long sides of the mobile base,
wherein the actuator is operable to adjust a height of the mobile base when the plurality of proximity sensors on long sides of the mobile base detect a change of state from non-blocked to being blocked or from being blocked to non-blocked.

14. A self-driving system, comprising:
a mobile base comprising a support surface and motorized wheels disposed under the support surface, the support surface having a first sensor and a second sensor;
an actuator disposed within the mobile base;
a console coupled to a first end of the mobile base in a standing configuration; and
a contact sensor disposed on an upper surface of the mobile base,
wherein the actuator is operable to adjust a height of the mobile base when the contact sensor detects a contact with an object.

15. The system of claim 14, wherein the contact sensor is disposed at a periphery of the upper surface near the console.

* * * * *